United States Patent

De Palma

[15] 3,644,117

[45] Feb. 22, 1972

[54] IMAGE-FORMATION IN STABLE POLARIZING MEDIA

[72] Inventor: Bruce E. De Palma, Boston, Mass.

[73] Assignee: Polaroid Corporation, Cambridge, Mass.

[22] Filed: Jan. 19, 1967

[21] Appl. No.: 610,378

[52] U.S. Cl. .........................................96/35, 96/27, 96/40, 96/89, 250/65, 346/76
[51] Int. Cl. .........................................G03c 5/00, G03c 5/04
[58] Field of Search................96/27 H, 35, 89, 40; 250/65.1; 346/76

[56] References Cited

UNITED STATES PATENTS

| | | | |
|---|---|---|---|
| 2,329,543 | 9/1943 | Land | 96/27 |
| 3,314,073 | 4/1967 | Becker | 346/76 |
| 3,351,948 | 11/1967 | Bonn | 250/65 |
| 3,396,401 | 8/1968 | Wonomura | 250/65 |

OTHER PUBLICATIONS

W. Grover, Electronic World, Vol. 74, No. 3, Sept. 65. pps. 45–48.

R. Saltonstall, et al., "Laser Technology," Hobbs Dormann & Co., N.Y. 1965. TK 7872.L353 pps. 92, 98, 102, 103, 117, 118.

D. O. Roshon & T. Young, IBM Tech. Dis. Bulletin, Vol. 7, No. 3, August 1964, p. 224; Printing by Means of Laser Beam.

*Primary Examiner*—Norman G. Torchin
*Assistant Examiner*—John Winkelman
*Attorney*—Brown and Mikulka, Robert F. Peck and William D. Roberson

[57] ABSTRACT

This disclosure concerns image-formation methods for forming visible images in polarizing media which are not generally considered photosensitive. The disclosed subject matter includes information pertaining to instantaneous film recording from television-type scanning signals, and the production of stereoscopic vectographic images.

8 Claims, 2 Drawing Figures

PATENTED FEB 22 1972

3,644,117

INVENTOR.
Bruce E. DePalma

BY Brown and Mikulka
and
William D. Roberson
ATTORNEYS

IMAGE-FORMATION IN STABLE POLARIZING MEDIA

BRIEF SUMMARY OF THE INVENTION

It is an object of this invention to provide a method for the formation of images by which images are produced instantaneously in a highly stable form without the necessity for elaborate chemical processing and without special darkroom treatment.

In one method of practicing this invention there is employed as an image-receiving medium normally unaffected by light, a transparent matrix material stained with a stable light-absorptive composition, preferably one which has an affinity for the matrix material and which exhibits, when associated with the matrix material, an increased light-absorption characteristic. An image may be formed by a very brief exposure of such a medium to image light, but only if the image light is of sufficiently high intensity that it exceeds a certain threshold value. Some image-receiving media of types useful in the practice of this invention have been employed heretofore for their polarizing properties, and in some aspects of this invention the polarizing properties of stained, molecularly oriented strata are employed to special advantage It is recognized that some polarizing materials have previously been bleached with ultraviolet radiation to create an image or design therein. For example, U.S. Pat. No. 2,329,543 which issued Sept. 14, 1943, to Edwin H. Land on an application filed May 20, 1938, describes a process by which images are produced in a form of light polarizer employing herapathitelike crystals incorporated in a light-transmitting film by exposure of the film to ultraviolet radiation over a sufficient interval of time. The effect of ultraviolet light on such a polarizer is cumulative as are the effects of light on most photographic materials. That is to say, a given intensity of image light integrated over a sufficient interval of time produces an image of particular characteristics in the exposed medium. As the intensity of the image light is reduced, the exposure interval must be increased to create an equivalent image. The practice of the present invention, however, rests on different principles. The photosensitive materials used in this process are distinguished by a nonintegrating characteristic, which is to say, the effects of the radiant energy impinging thereon do not accumulate over long periods of time, except when the energy rate per unit area of exposed image-receiving surface exceeds a critical high-threshold level. Such materials are not generally considered photosensitive.

The image-receiving media employed in the practice of this invention possess in common certain other characteristics in addition to that of stability under normal ambient levels of light intensity. For example, they must incorporate a chromophore or staining agent through which the energy of high-intensity image light exceeding the threshold level may be absorbed or coupled into the image-receiving sheet to produce an image. The chromophore, dye, or staining agent must be substantially absorptive at least to those wavelengths of light intended to be used to create the image.

Iodine may be considered for the moment as a representative staining agent. Iodine can be incorporated in high concentrations in films or fibers of many hydrophilic organic high polymers, both crystalline and amorphous, natural and artificial. Examples are starch, cellulose, polyvinyl alcohol, polyamides, and many of their derivatives. These polymers are all transparent to the visible wavelengths of the spectrum, whereas the iodine stain which may be incorporated therein is absorptive to light in this region. It may be significant to note that an increase in the absorption coefficient of the iodine accompanies its incorporation into such polymers.

Significant, also, is the fact that unexpectedly large heats are evolved when iodine is added as a staining agent to an organic polymer. The affinity between the polymer and the iodine is an important reason for the fact that iodine stains in such polymers exhibit a certain tenacity and permanence. If they bleach at all when exposed to normal daylight radiation levels, it is at a very slow rate. Iodine-stained polymers are not therefore considered to be photosensitive materials. However, this invention makes use of the discovery that radiation levels which exceed a certain high-threshold value can cause an instantaneous image-producing effect in media stained with iodine and other dyes. It appears that this image-producing effect is a consequence of the absorption by the staining agent of the radiant energy impinging thereon at a rate in excess of the ability of the stained sheet material to reabsorb from the staining agent the thermal energy accumulating therein.

One theory in attempted explanation of this phenomenon is that high-energy levels, i.e., those exceeding the aforesaid threshold value, are responsible for a localized and selective energic disruption between the staining agent and its matrix material, an effect which overcomes the affinity which binds the constituent materials of the image-receiving medium. According to this theory, the image-forming radiant energy works its effects thermodynamically on the medium at precisely those points wherein the absorption of the radiant energy occurs in some cases bleaching the staining agent and in other cases so weakening the bond or affinity between the stain and its matrix that the stain may be readily removed from the matrix.

With this brief summary as a background, the invention will be seen to comprise the process involving the several steps and the relation of one or more of such steps with respect to each of the others which are exemplified in the following detailed disclosure. The scope of the application is indicated in the appended claims.

DETAILED DESCRIPTION

Figure 1:
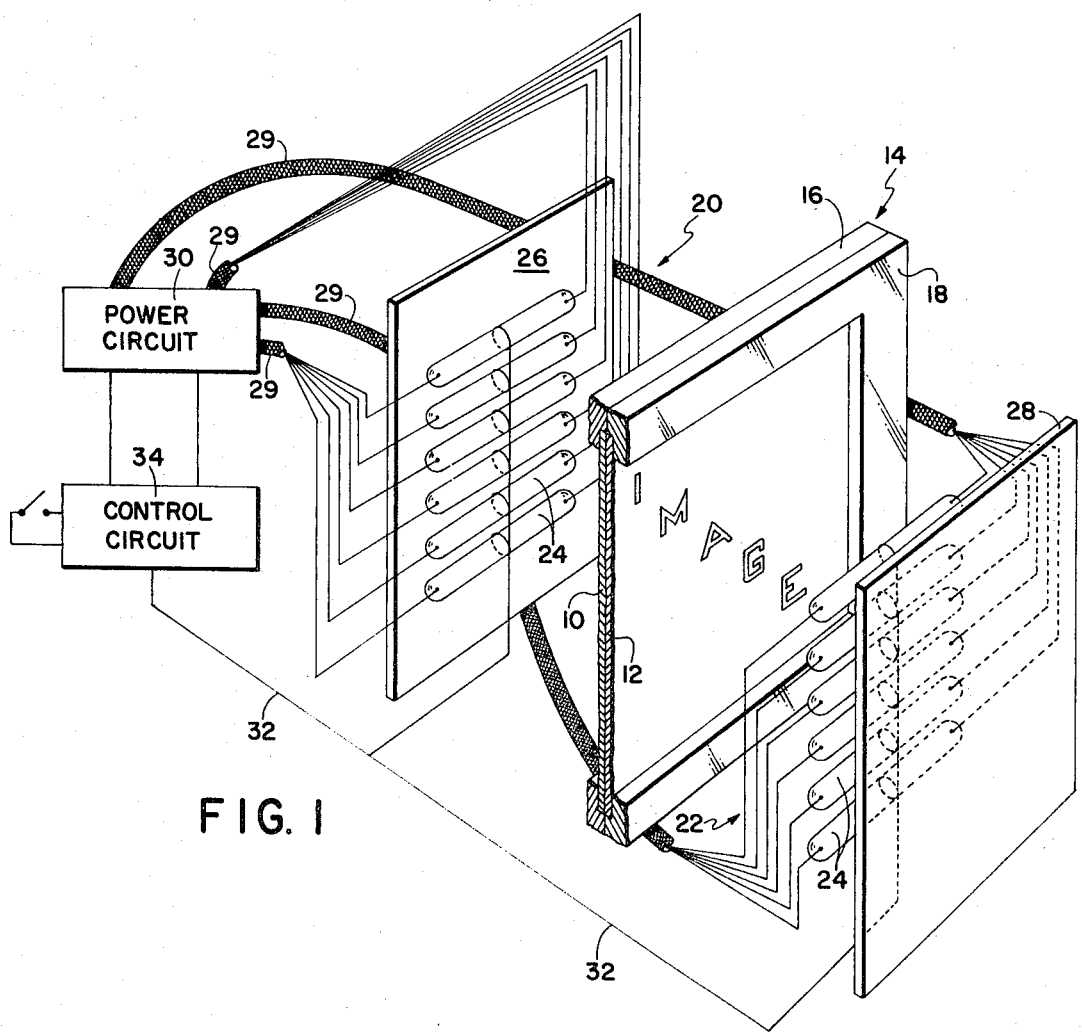
FIG. 1 is a partly diagrammatic, partly pictorial illustration of an arrangement by which images may be formed instantaneously in stable image-receiving media in accordance with one aspect of the invention.

It is worthwhile at this point to explore the characteristics of certain preferred forms of image-receiving media which have shown themselves to be particularly useful in the practice of the invention. It should be borne in mind, however, that although the examples to be discussed are currently preferred, they are and should be considered as illustrative of a wider variety of image-receiving media which may be employed in the practice of the invention.

High-quality images exhibiting a pleasing range of densities are obtainable by optically bleaching a dichroic sheet polarizer of a type known widely as H-sheet. H-sheet is available commercially in different grades from Polaroid Corporation in Cambridge, Massachusetts. H-sheet may be described as a polarizer comprising a dichroic sorption complex of iodine on a molecularly oriented polyvinyl composition. It may be formed by first stretching or otherwise orienting a film of linear polyvinyl alcohol, which is an optically transparent matrix material, and thereafter incorporating within the film a dichroic chromophore formed by dyeing or staining the film with iodine, as described in U.S. Pat. No. 2,237,567, which was issued Apr. 8, 1941, to Edwin H. Land on an application filed May 4, 1939.

Improved techniques for making certain forms of such polarizers are disclosed in U.S. Pat. No. 2,554,850, which issued May 29, 1951, to Fredrick J. Binda on application filed June 18, 1948. The borating process described in the latter patent, when performed on iodine-stained films of oriented polyvinyl alcohol, hereafter called borated H-sheet, yields dichroic polarizers which are particularly stable under the influence of heat and light, including ultraviolet radiation. Nevertheless, a stable polarizing material such as borated H- sheet may be employed in the practice of this invention as a photosensitive image receiving medium.

Although borated H-sheet is a stable product, it may like other organic materials be destroyed by prolonged exposure to temperatures or light levels which are sufficiently high as to carbonize or otherwise bake out the essential characteristics of the constituent materials. Needless to say, destruction of the image-receiving medium is not within the scope of this invention. However, a medium having characteristics such as those exhibited by borated H-sheet may receive and retain a stable and permanent image upon exposure to a brief flash of image-modulated illumination of sufficient intensity that the stability of the medium is overcome to some extent, at least in selected areas of the medium. When forming images in this manner in stable image-receiving media, the intensity of the image-forming light exceeds typical ambient levels of illumination by orders of magnitude. During the brief exposure the intensity of the image-forming light is in fact so high that if the exposure were greatly prolonged the medium would in almost all cases suffer destruction.

Borated H-sheet is a particularly useful image-receiving medium to illustrate the invention because of the different types of image characteristics which it can exhibit. The image formed by brief exposure of borated H-sheet to a sufficiently high level of intense image-modulated light is immediately visible after the exposure as a positive bleached image having a range of optical densities. Because H-sheet is a polarizer, the image is also rendered in terms of polarized light, the highlights being less polarized than the darker areas. The image, moreover, shows signs of being fully developed, in one sense, and partially developed in another. Where the normally grey H-sheet has been exposed to image-forming illumination the immediately resulting image has a yellowish hue, which may be removed simply by washing the image-receiving medium in warm water. The yellowish characteristics of the image are associated with an invisible latent image also present in the sheet. This latent image is capable of being developed by a water wash. A curious aspect of the image formed in borated H-sheet may become evident in the washing process. Immediately after immersion the original characteristics of the H-sheet appear to be restored, as the H-sheet reverts to its original uniform grey appearance. In fact, the washing process may be arrested at this stage with the borated H-sheet exhibiting no substantial image characteristics. The image remains, however, in a latent form, and resumption of the washing process restores the image in a fully developed form. Other media, discussed below, may exhibit little, if any developed image characteristics until washed in a similar manner.

Another significant property of the image formed by this method in H-sheet is its physical relief characteristic. It is seen on careful examination, particularly after the washing process, that the polyvinyl alcohol matrix has undergone a selective diminishment in different image areas, being thinner in highlight areas and thicker in the undarkened, less exposed areas. The physical effect is strikingly similar to the relief characteristics visible in transparencies resulting from some color development processes or the gelatin relief images formed as a consequence of a variety of photosensitive tanning processes.

The exposure of borated H-film to intense image-forming light does more to the image-receiving layer than simply bleach it. The bleaching effect, however, is direct and obvious. It results in an immediately useable and stable image, which may have wide application for such purposes as photographic copying and television film-recording, to cite but two examples. The visible bleaching effect is accompanied, however, by less obvious effects associated with the previously mentioned latent image. It appears that the bleaching of the H-sheet alters the nature of the polyvinyl alcohol matrix, rendering it less capable of retaining the chromophore incorporated therein. This may be demonstrated in the following example. The iodine-stained borated H-sheet is first exposed to high-intensity radiation of brief duration producing a visible image in the medium. The H-sheet is subsequently washed to remove the yellowish cast of the image and to improve the clarity of the image. It is then redyed with iodine, whereupon the image turns a brown color. Upon subsequent boration of the H-sheet the brown image turns the same shade as the surrounding H-sheet thus restoring the H-sheet to the appearance which it had prior to the exposure. However, subsequent washing of the exposed and redyed H-sheet causes the image to reappear, indicating strongly that the PVA has lost its ability to retain the chromophore, i.e., the iodine complex, in a permanent form within the sheet.

Lest it be felt that the PVA film is alone responsible for the image characteristics of the H-sheet, it should be pointed out that a clear unstained film of polyvinyl alcohol, whether oriented or unoriented, does not capture or exhibit any image characteristics upon exposure to image-forming light of equivalent intensities. The image-forming effect in the stained or dyed medium is a function of the spectral characteristics of the light employed in the exposure. First, the wavelengths of light employed during the exposure for the purpose of creating the image should be within the absorption band of the chromophore or staining agent. However, the intense exposure light should not be of a wavelength or wavelengths within an absorption band of the matrix material. Second, where the image-receiving medium is a dichroic polarizer, the exposing image-forming light should contain a major proportion of light which is either unpolarized or polarized transverse to the transmission axis of the polarizer. The matrix material should be transparent or at least light-transmissive to the image-forming illumination, whereas the staining agent should be optically dense. When the image-forming illumination strikes the staining agent in the image-receiving medium it undergoes an energy transformation, a major portion being converted to thermal energy. The image-forming effect does not appear to be photochemical in nature, but gives evidence of being primarily thermodynamic. The thermal energy accumulates within the staining agent or chromophore at a rate much more rapid than that at which it can be conducted away by the adjacent matrix material. As a consequence, the energy captured by the image-receiving medium works its effect on the medium in a highly selective manner altering the stability of the medium only at those points where image characteristics are to be produced.

The properties of an iodine-stained image-receiving material such as borated H-sheet may be contrasted with those of image-receiving materials incorporating different stains or dyes. Consider an image-receiving medium similar in all essential respects to H-sheet but incorporating a dichroic color dye and mordant instead of iodine. Examples of dyes effective for this purpose are C.I. Prototype 470 (Direct Green 27), C.I. 28160 (Direct Red 81), and C.I. 29000 (Direct Yellow 44). When a borated and oriented polyvinyl alcohol film stained with such a dye is exposed to a brief flash of intense image-forming illumination, an initial inspection of the medium may suggest that little or no useful image has been captured or retained by the material. The image is nevertheless present in a latent form. This is demonstrated when the sheet is subsequently washed in warm water and a positive, fully developed image immediately appears.

The dye washes out of the image portions of the material which have received sufficient energy during the exposure. One reason that the image is immediately discernible in the iodine-stained film but is not necessarily visible in image-receiving media dyed with dyes such as those above-mentioned may reside in the peculiar properties of iodine when incorporated in organic polymers. Iodine as a staining agent undergoes an increase in its light-absorption characteristics when adsorbed in such polymers. Hence, the disruption of the attachment between the iodine and its matrix results in an immediately visible image, although this is not a universal characteristic of all image-receiving media which may be used in accordance with this invention. In any case, it appears that the staining agent is responsible for coupling the intense illumination into the otherwise transparent substrate and altering the stability of the stained product by disrupting or weakening the affinity which binds staining agent and matrix together, thereby creating a positive image, either developed or latent depending on the relationship between the staining agent and the matrix material with which it is associated.

In the practice of this invention the threshold level of intensity at which image-forming effects occur varies, of course, with the nature of the image-receiving medium employed. It is affected by the degree of stability exhibited by the stained or dyed medium, the absorption characteristics of the chromophore within the medium, and the spectral distribution of energies in the light source employed. Other factors may also affect the threshold level to some extent. Among these may be the temperature of the image-receiving medium at the time of exposure, and the amount of moisture present therein. There is reason to believe that moisture acts as an energy-absorber during the exposure and may inhibit the image-forming process if present in sufficient quantities.

All of this is not to indicate that the intensity of the image-forming illumination is necessarily of a highly precise and critical level which must be matched exactly. The effectiveness or quality of an image rests largely on subjective considerations, being judged in many cases by the extent to which it pleases an observer. In fact, techniques for the determination of a correct exposure level to be used on a particular image-receiving medium need not be greatly different from the test-strip procedures often employed in connection with the exposure and processing of traditional photosensitive materials. That is, a number of test exposures may first be made differing in the intensity and, perhaps, in the time-energy distribution on the exposure light. The resulting images may then be judged subjectively to determine the exposure parameters to be used in the formation of successive images.

The image-copying arrangement shown in FIG. 1 should serve as to illustrate the utilization of the threshold phenomena which is an important element of the patent invention. An image-receiving medium 10, for example, borated H-sheet, is shown supported vertically in face-to-face relationship with a primary image carrier 12 which may take the form of a photographic transparency bearing an image to be duplicated in medium 10. An easel 14 which supports medium 10 and image carrier 12 comprises two frame halves 16 and 18, each having a window therein through which light may be admitted on either side. Two light sources 20 and 22 respectively positioned on opposite sides of the easel are each shown as comprising an array of closely spaced high-intensity gas-filled capacitor-discharge flashlamps 24 positioned adjacent to light reflectors 26 and 28. Lamps 24 are connected individually by cables 29 across separate charged capacitors (not shown) in power circuit 30. To assure simultaneous firing of each flashlamp, a single high-voltage trigger electrode 32 energized from control circuit 34 is wrapped about or is otherwise positioned adjacent each lamp. The details of the power and trigger circuits for the capacitor-discharge flashlamps are not illustrated since they may be of any known type and because they are not the subject of this invention.

As can be seen, when the lamps 24 are flashed, the light rays incident on the image-receiving medium 10 from the left-hand light source 20 are uniform and unmodulated. However, those impinging on the medium from the right-hand light source 22 are modulated in passing through the image-bearing transparency 12.

The intensity of radiation incident on the image-receiving medium 10 from the unmodulated light source is selected to coincide approximately with that threshold value above which the medium begins to exhibit a bleaching or other image-forming effect. The light from the other source, in passing through the primary image-bearing member 12, provides modulated image light which produces, in combination with the threshold illumination, an additive image-forming effect. The stability of the image-receiving medium 10 is consequently altered to a greater extent at those points where more light penetrates to the medium and to a lesser extent at those points covered by the less transparent portions of the primary image carrier 12.

The threshold value of the image-forming illumination is a rate-dependent factor. It depends not only upon the nature of the image-receiving medium employed, and not only upon the wavelength distribution of energies in the image-forming illumination, but also upon the duration of the illumination. The rate-dependent quality of the illumination is quite different, however, from that encountered in typical photoduplication processes. As the exposure interval is compressed, the peak energy of the illumination required to produce an equivalent image may even decline. For example, in exposing to image-forming illumination an image-receiving medium consisting of an iodine-stained and borated layer of molecularly oriented polyvinyl alcohol, a satisfactory image exhibiting a pleasing range of light, dark and intermediate tones was reproduced in the medium by the use of a lamp system providing 800 watt-seconds of illumination over an interval of 1 millisecond. However, an equivalent image was formed with another lamp system producing but 100 watt-seconds of illumination over an exposure interval of 100 microseconds. To produce an acceptable image, the last-mentioned exposure required only one-eighth of the energy required in the previous example. It can thus be seen that the process does not depend on the integration of illumination over the exposure interval as in almost all prior photographic processes.

Until this point little emphasis has been placed upon the polarization characteristics which can be exhibited by images formed in accordance with this invention. These polarization characteristics however impart another order of utility to the invention. An image formed in terms of polarization, when examined with a polarizing analyzer, can exhibit a wide tonal range, being of low contrast or invisible when the polarization axis of the analyzer is parallel to that of the image, and of high contrast when the analyzer is rotated 90°. If two such images are superimposed with their axes at 90° to one another, they may be viewed independently by looking through another polarizer. When this viewing polarizer has its polarization axis parallel to that on one image, that image is invisible and the other is seen in full contrast as above. If the viewing polarizer is rotated 90°, the first image is seen in full contrast and the second disappears. Each image of such a pair is complete and continuous and is not changed or suppressed by the presence of the other image. In three-dimensional applications two polarizing images oriented in this way and representing a stereoscopic pair have been printed in stereoscopic registry on opposite surfaces of a single sheet of film. An observer wears a viewer with polarizing left- and right-eye filters with their polarization axes at 90° to one another and each at 90° to the polarization axis of the corresponding image. Each eye then sees only the image intended for it, and the pair of images appears as a single, three-dimensional picture.

Figure 2:
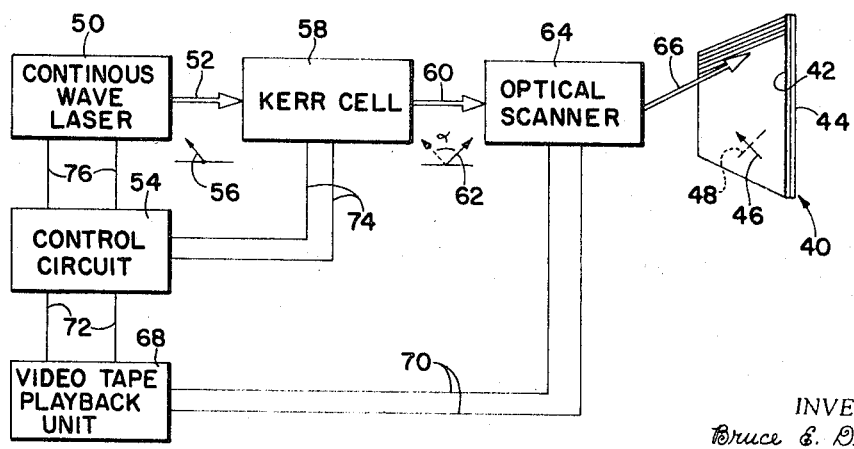
FIG. 2 is a diagrammatic illustration of an arrangement by which vectographic images may be formed in stable image-receiving media using beam-scanning techniques according to another aspect of the invention.

One of the virtues of this invention is the vast simplification which it makes possible in processes of producing polarizing images of this type, either singly or in stereoscopic pairs on either side of a suitably prepared image receiver. FIG. 2 illustrates diagrammatically a system particularly adapted for the production of stereoscopic polarizing images. The image-receiving medium 40 may comprise two sheets 42 and 44 of oriented dichroic polarizing materials. These may be any one of the stable types previously discussed and are preferably sandwiched together with their polarization axes oriented at 90° with respect to each other. This orientation is represented by arrow 46 associated with sheet 42 on the first surface of the sandwich combination and by arrow 48 associated with sheet 44 on the opposite surface of the combination. Before any images have been formed in the medium 40, it exhibits a relatively high optical density because of the crossed orientation of the polarization axes. If the medium 40 is formed by a pair of H-sheets, it is nearly opaque. If, on the other hand, the medium comprises a combination of similar-colored polarizers, the color of the combination tends to be saturated in the particular hue exhibited by the polarizers; such a combination possesses a high optical density to light of other hues.

By the practice of this invention, it is possible to create images selectively in either or both of the two components of such an image-receiving medium by employing intense polarized light for the formation of the images and by controlling the polarization azimuth of the light. Even if all of the intense image-forming illumination to which the medium is exposed passes through the first polarizing sheet 42 on its way to the second sheet 44, an image can be formed in the latter component without substantially altering the characteristics of the first component.

In the system represented diagrammatically in FIG. 2, the source of image-forming illumination is a continuous wave laser 50 capable of generating an intense beam 52 of light of sufficiently high intensity to overcome the inherent stability of the image-receiving medium 40. The laser source is modulated by control circuit 54 to control the energy in the beam. The coherent light of the beam 52 is polarized at a particular azimuth represented by vector 56 as it enters an optical rotator represented by Kerr cell 58. By the application of controlled potentials to the Kerr cell 58 from control circuit 54 the polarization azimuth of light passing therethrough may be altered. The beam 60 emerging from the optical rotator may therefore have its polarization vector 62 rotated through any angle α, depending upon the control potential. The combination of the controlled laser source 50 and optical rotator 58 thus constitutes a source of intense polarized light capable of being modulated both in intensity and in angle of polarization.

The controllable beam 60 from such a source is next incident on an optical scanner 64 of any known type capable of redirecting the beam as shown at 66 upon the image-receiving medium 40 to scan the entire image-receiving area according to a programmed sequence. While the intense beam of light 66 thus progressively traces a path across the image-receiving medium 40, it may be modulated in intensity and polarization azimuth in accordance with information received from a primary image-controlling means 68 such as a video tape playback unit. Magnetic tapes employed by the playback unit may contain image information previously recorded on the tapes. Alternatively, the light source may be modulated by output signals from a vidicon in a television camera contemporaneously directed at an original subject. The modulation of the intense image-forming illumination of beam 66 must of course be coordinated with the scanning sequence of the beam and with information signals produced by the primary-image-controlling means 68. The drawing diagrammatically represents this type of coordination by the synchronization connections 70 between the primary image controlling means 68 and scanner 64, by image signal connections 72 between unit 68 and control circuit 54, by potential connections 74 from the control circuit 54 to the image rotator 58, and by amplitude signal connections 76 from the control circuit 54 to the laser source 50.

During the scanning sequence each incremental area of the image-receiving medium is exposed briefly to an intense flash of image-forming light, the period of exposure of each area being very short because the scanning beam dwells but briefly on any one spot. The exact scanning sequence is a matter of choice. For example, an image may be traced first in sheet 42 of the image-receiving medium 40 while the beam incident thereon is polarized transverse to the polarization angle of sheet 42. Immediately subsequent to the formation of an image in the first sheet 42 the polarization azimuth of the exposing beam 66 may be rotated through 90° by changing the control potentials applied to Kerr cell 58. In this type of sequence, the light employed for the formation of the second image has a polarization azimuth aligned with the axis of the first sheet 42 but transverse to the axis of the second sheet 44. It is to be noted that the beam then passes with very little attenuation through the first sheet 42 and is then absorbed in substantial amounts by the second sheet 44.

Instead of employing an intense beam which is always polarized at an azimuth parallel to one of the two image-receiving sheets and switching the polarization azimuth through 90° to trace each image, another technique is possible. Thus, the polarization azimuth may be rotated by lesser amounts than 90° to result in a differential absorption of the energy contained in the beam by each of the two sheets simultaneously. For example, when the polarization azimuth of the exposed beam is at 45° to the axis of the two sheets, nearly equivalent energies will be absorbed by each sheet during the scanning sequence. A small shift in the polarization azimuth of the exposing beam then results in one of the sheets absorbing more energy than does the other sheet. By continuously controlling the polarization azimuth of the exposing beam, it is possible to create a composite vectograph image with but a single scanning sequence of the image-receiving medium.

It is thus to be noted that the formation of images in image-receiving sheets as contemplated by the present invention may involve control of the intensity of the image-forming light, the wavelength of that light and the polarization azimuth. The intensity of the illumination necessary to produce an image is dependent upon the ability of the image-receiving medium to absorb energy from the exposed light source. If the image-receiving medium is substantially transparent to the energy of the light source, whether because of the polarization azimuth thereof or because the wavelength of the light is outside of the absorption bands of the medium, no image would be produced. Satisfactory images have been formed in a vectographic pair of crossed H-sheets by the use of a continuous wave laser beam having a wavelength of 6,328 A. units. The power level of the beam was approximately 80 milliwatts and was focused on the image-receiving medium in a beam one-tenth of a millimeter in diameter.

Two principal illustrative examples have been described of particular methods by which images may be formed in stable image-receiving media which are not generally considered photosensitive. A variety of examples of particular media has also been described. It is to be understood, however, that the two principal embodiments discussed and the types of media described are primarily illustrative in nature. These should serve to demonstrate the broad utility to which this invention may be put. The appended claims are intended to comprehend the broader aspects of the invention.

What is claimed is:

1. An image-formation method comprising the steps of:
    forming a stable image-receiving dichroic polarizing medium with a predetermined polarization axis by staining a layer of oriented light-transmissive polymer with a staining agent to render said medium absorptive to light having a polarization azimuth transverse to said axis, said stained polarizing medium exhibiting a substantial stability to the influence of ambient levels of illumination;
    exposing certain areas of said image-receiving medium briefly to intense image-modulated light polarized at an azimuth transverse to said polarization axis, the intensity of said image-modulated light at certain areas of said medium exceeding a threshold value during exposure above which the stability of said polarizing medium is permanently altered to form in said medium a positive image rendered in terms of polarization characteristics and representative of the intense image light employed to expose said polarizing medium.

2. The image formation-method according to claim 1, wherein the exposure step is performed by:
    exposing one side of said image-receiving medium briefly to intense illumination of spectral characteristics to which said medium is normally stable, but at a level of intensity below said threshold level,
    simultaneously with said last-mentioned step exposing corresponding areas on the other side of said polarizing layer or sheet to image-modulated light to form said positive image in said medium.

3. An image-formation method comprising:
    superimposing a pair of stable dichroic polarizers with their polarizing axes crossed, each of said polarizers being absorptive of predetermined wavelengths of light polarized transverse to its optical axis;

scanning said superimposed pair of polarizers with a beam of intense image-forming polarized light of at least one of said wavelengths, the intensity of said beam exceeding a threshold value during scanning above which the stability of either of the polarizers in which it is absorbed is permanently altered, simultaneously with said last-mentioned step modulating said beam in accordance with image information to form an image in at least one of said polarizers in terms of polarization characteristics.

4. The method of claim 3 in which the modulation of said beam is accomplished at least in part by varying the polarization properties thereof to control selectively the influence of said beam on each of said polarizers.

5. The method of claim 3 in which the modulation of said beam is accomplished at least in part by varying the intensity of said beam to control the image characteristics produced in at least one of said polarizers.

6. The method of claim 3 in which the modulation of said beam is accomplished by varying the polarization properties and the intensity thereof to control the image characteristics produced in both of said polarizers.

7. The method of claim 3 in which the modulation of said beam is accomplished by varying the polarization properties and the intensity thereof to simultaneously control the image characteristics produced in both of said polarizers.

8. An image-formation method comprising:

staining a transparent carrier sheet of oriented polymer with iodine to form a dichroic polarizer;

exposing said iodine-stained carrier sheet to radiant energy selected from a spectral band to which the material of said carrier sheet is transparent and to which said iodine stain is absorptive, the peak power of said radiant energy per unit area of the carrier sheet on which it impinges being greater than the rate at which the material of said carrier sheet can absorb energy from said iodine stain, and forming an image in said carrier sheet by modulating the intensity of said radiant energy incident on selected portions of said carrier sheet.

* * * * *